June 11, 1968 J. R. RAWLEY 3,388,331

AUTOMATIC FREQUENCY CONTROL OF A RADIO RECEIVER

Filed May 28, 1965

INVENTOR.
JOHN R. RAWLEY

BY [signature] [signature]
ATTORNEYS 3,388,331
Patented June 11, 1968

3,388,331

AUTOMATIC FREQUENCY CONTROL OF A RADIO RECEIVER

John R. Rawley, 1838 Rockwell Road, Abington, Pa. 19001

Filed May 28, 1965, Ser. No. 459,960
6 Claims. (Cl. 325—420)

ABSTRACT OF THE DISCLOSURE

A radio receiver is provided with a frequency control system having three bandpass filters which respectively pass signals in the frequency range below, within, and above the normal voice range. If a voice signal drifts out of the voice range, it is detected and returned to the center of the voice range. Detection is achieved by a scanning device which causes a search to be made through an anticipated frequency range until the voice signal is detected, whereupon a control network reinstates the drifted signal to the center of the voice range.

The invention described herein may be manufactured and used by or for the Government of the United States of America for governmental purposes without the payment of any royalties thereon or therefor.

The present invention relates to frequency control of a radio receiver and more particularly to an automatic frequency control in a single side band radio reecivder.

In the field of AM radio broadcasting the signal is broadcasted by modulation of a carrier wave. Analysis of the frequency components of the broadcasted signal reveals that there are a constant carrier signal and two side bands of varying frequency differing from the carrier frequency by the frequency of the audio signal being broadcasted. In single side band broadcasting, however, the carrier and one of the two side bands are suppressed leaving only a single signal of frequency varying according to the frequency of the audio signal being broadcast. In the receiving of this single side band signal it is customary to use a superheterodyne type receiver in which the incoming signal is mixed with an oscillator frequency which brings the signal down to an intermediate frequency. The signal is amplified at this intermediate frequency after which a constant frequency at the basic intermediate frequency is subtracted from the received signal. The resultant frequency is the audio frequency output signal, which presumably is substantially identical to the original audio broadcast signal. When the single side band transmitter and receiver are stationary with respect to each other the oscillator bringing the received signal down to the intermediate frequency and the frequency generated to bring it down to the audio frequency range may be made precise enough that no elaborate frequency control is necessary. However, when either the transmitter or the receiver or both are traveling at high rates of speed, as for example in modern high velocity jet aircraft, there may be a substantial shift of the broadcast signal as it appears at the receiver due to the Doppler frequency shift phenomenon. Since any frequency shift in the received signal is carried through as a shift in the audio frequency output of the receiver a relative speed between transmitter and receiver which causes a substantial shift in the received signal can shift the frequency of the audio frequency output sufficiently that the message is blurred or substantially obscured. Since there is no carrier frequency accompanying the broadcast signal there is no reference on which a frequency control system can be based.

The general purpose of this invention is to provide a frequency control system for single side band receivers which relies on the assumption that the audio signal lies entirely within a predetermined voice range, generally 400 to 2500 cycles per second. Utilizing this assumption the present invention detects a drift from this predetermined range and alters the frequency of the mixing oscillater to return the audio output to the center of the voice range. A scanning device detects when there is no usable signal in the voice range and causes a search to be made through the anticipated frequency range until a voice signal is detected. Then the control network centers this received audio output in the center of the voice range.

It is an object of the present invention to provide an automatic frequency control system for a single side band radio receiver which centers a received audio frequency output in the center of a predetermined voice range.

Another object of the invention is to provide a control network to hold a received audio output between predetermined limits.

A further object of the invention is to provide a scanning signal which causes the received audio output to pass through a range of frequencies until frequencies in a predetermined voice range are detected.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 2:
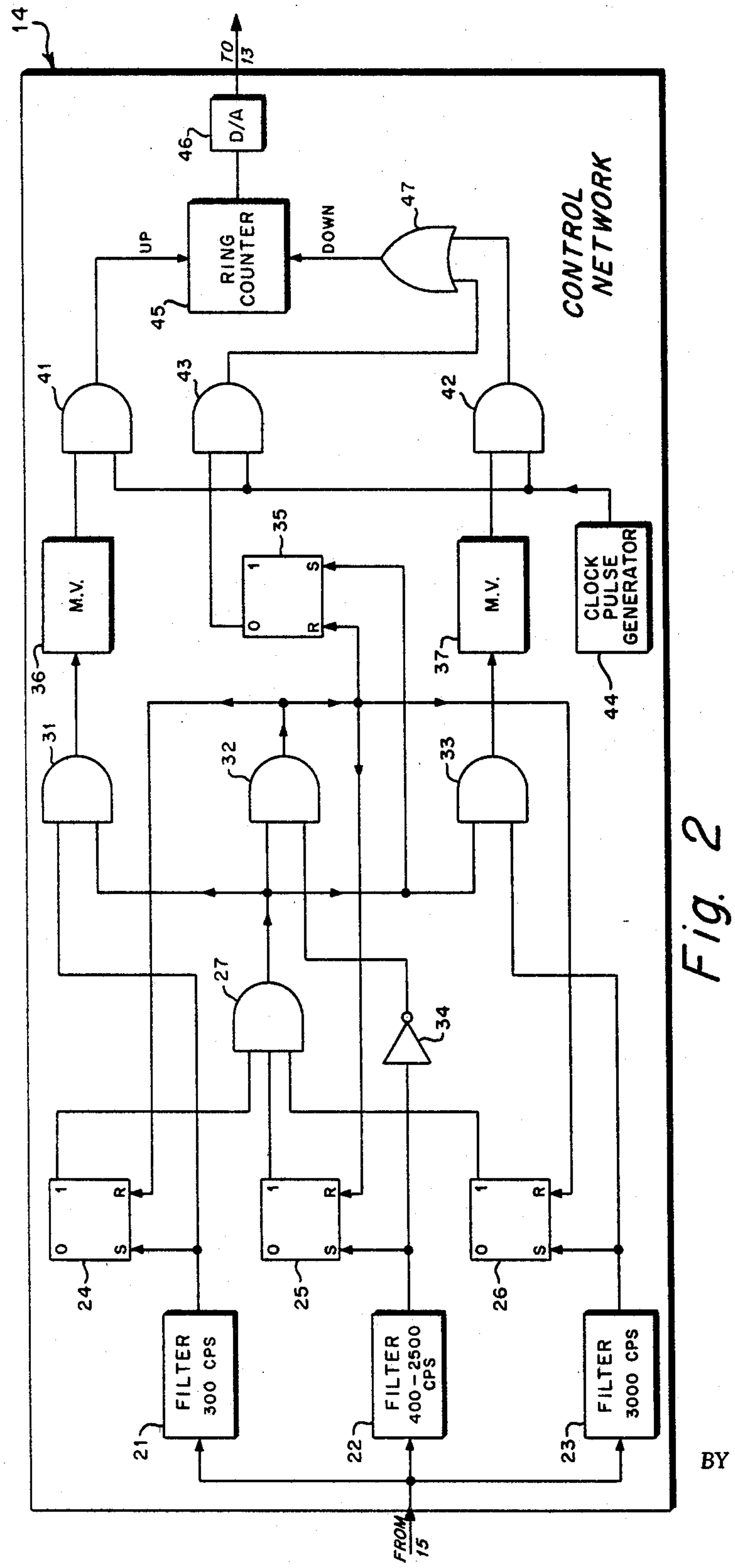
FIG. 2 shows a block schematic diagram of a control network in the radio receiver of FIG. 1.
Figure 1:
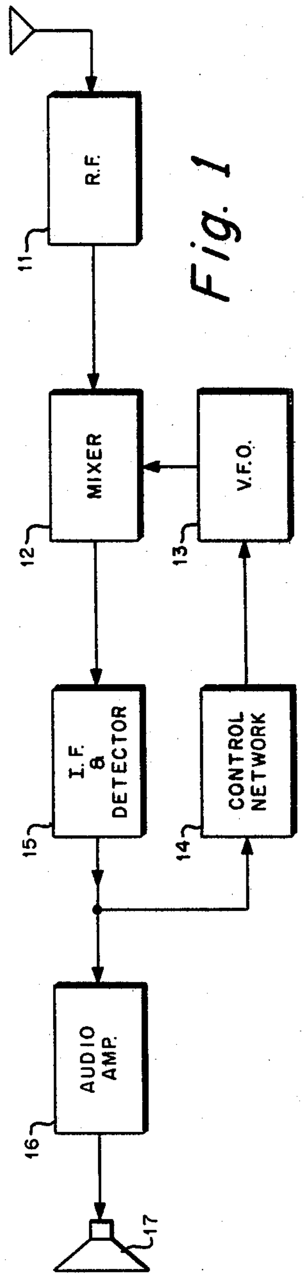
FIG. 1 shows a block schematic diagram of a radio receiver according to the present invention.

In FIG. 1 the received signal is detected by a radio frequency detector 11. This comprises a tuned coil, as is well known in the art. The output of the radio frequency detector 11 is mixed in a mixer 12 with the frequency from a variable frequency oscillator 13. Variable frequency oscillator 13 is an oscillator the frequency of which is controllable by some means, generally an outside control voltage. The signal to control the frequency of oscillator 13 is provided from a control network 14, the details of which are shown in FIG. 2. The output of mixer 12, which is the difference between the received radio frequency signal and the oscillator frequency from oscillator 13, is sent to an intermediate frequency amplifier and detector 15. There the signal is amplified and sent through a detector which subtracts a set frequency from the intermediate frequency signal. The resultant of this is a difference frequency which is sent to audio amplifier 16 and amplified to be sent out to a speaker 17, which may be either a loud speaker or earphones or other means known in the art. The audio output of detector 15 is also sent to control network 14 where it is analyzed, and the control signal for variable frequency oscillator 13 is generated as a result thereof.

The control network 14 as shown in FIG. 2 has three filters 21, 22 and 23 of different band passes. Filter 21 is a narrow band filter which gives an output signal only when the incoming signal has components in the immediate vicinity of 300 cycles per second. This is considered to be slightly below the range of the anticipated voice range signal. Flter 22 is a broad band filter tuned to the anticipated voice range of 400 to 2500 cycles per second. Filter 23 is a narrow band filter tuned to approximately 3000 cycles per second which is a little above the anticipated voice range. It is anticipated when the received signal is correctly centered there will be no appreciable output from filter 21 or filter 23. It will be understood that some transmitters which are higher fidelity will transmit an audio signal which extends over a broader range, for example, 200 to 4000 cycles per second. In this case the filters 21 and 23 will be tuned to points outside this broader band, for example, 100 cycles per second and 4500 cycles per second. The outputs from filters 21 through 23 pass to three flip-flops 24, 25 and 26, respectively, where if the output is of sufficient strength it will set the associated flip-flop as shown. The set output signals of each flip-flop, designated as "1," are passed to an AND gate 27 which gives an output when all three flip-flops 24 through 26 are set.

The outputs from filters 21 through 23 also are passed to a set of three AND gates 31 to 33, respectively. The output of filter 22 is effectively inverted by a inverted 34 in the sense that inverter 34 gives an output to AND gate 32 only when there is no output from filter 22. Each of the AND gates 31 to 33 also receives a signal from the output of AND gate 27 and each of gates 31 through 33 will give an output when both inputs to it are high. The output of gate 32 when high resets flip-flops 24 through 26. It also resets another flip-flop 35 which is set by the output from AND gate 27. The characteristic of flip-flop 35 is such that when it receives both a set and reset signal at the same time, it will reset. Flip-flop 35, as well as flip-flops 24–26 may comprise any bistable storage element, including, but not limited to, bistable multivibrators, tuned diodes, magnetic cores, and others. AND gates 31 and 33 feed into two multivibrators 36 and 37, respectively. Multivibrators 36 and 37 may be one-shots which are on for a predetermined period of time after gates 31 or 33 go high, or they may be triggers which are on for as long as the outputs of the respective gates 31, 33 are high.

The outputs of multivibrators 36 and 37 and the reset point of flip-flop 35 are passed to three AND gates 41, 42 and 43, respectively. AND gates 41 through 43 also receive clock pulses from a clock pulse generator 44 and the pulses will pass through one of the gates 41 through 43 if it is enabled by a signal. The clock pulses from clock pulse generator 44 will pass through AND gate 41, if it is enabled, to a ring counter 45 at its UP position. Ring counter 45 is a counting means which may be counted either up or down depending on the place at which the clock pulses are put in. The condition of ring counter 45 is translated to an analog signal by digital-to-analog converter 46. The output of digital-to-analog converter 46 is taken to variable frequency oscillator 13 to control the frequency thereof. The outputs of AND gates 42 and 43 are passed through an OR gate 47 to the down side of ring counter 45.

The operation of the control network is as follows. Flip-flop 35 is originally reset on zero, which enables gate 43 to pass clock pulses continuously from generator 44 to the ring counter 45. This causes ring counter 45 to count down continuously and recycle, which causes the oscillator 13 to scan through the anticipated range of frequencies. The result will be that the output of the I.F. amplifier and detector 15 will similarly scan through the audio range. As it scans through the audio range it will contact first one of the filters 21 or 23, in this embodiment filter 23. As it does so there will be an output from that filter which will set the associated flip-flop 24 or 26, respectively. As the audio signal scan continues the second filter 22 will receive a signal in its range which will set flip-flop 25. As the signal continues through further the last of the three filters will be activated setting the last of the three flip-flops. When this occurs gate 27 will be enabled to pass enabling signals to the three gates 31, 32 and 33. Assuming at this point that filter 22 is still issuing an output, gate 32 will be disabled. The signal from gate 27 will set flip-flop 35, which will shut off the passage of clock pulses from generator 44 to the ring counter 45. However, one of the two gates 31 and 33 having still a signal from its associated filter will be enabled. Its associated multivibrator 36 or 37 will send a pulse into gates 41 or 42, respectively, in which case the gate will pass signals through with the result that ring counter 45 will be caused to back up thereby centering the audio signal between the ranges of the two filters 21 and 23. Should the received signal vary from the center of the voice range, as indicated in filter 22, it will activate one of the two filters 21 or 23. This will activate the associated gate 31 or 33, respectively. Clock pulses will be sent through gate 41 or 42 as the case may be to cause ring counter 45 to count in the direction necessary to recenter the audio signal.

When the signal on filter 22 quits either because the signal has been dragged completely out of the audio range or because there is no transmitted audio signal, gate 32 will be activated. This will reset flip-flops 24 through 26 and 35 causing to be set in motion the scanning mechanism. Filters 21–23 may be equipped with some form of energy storage or time delay mechanism to give a constant high output throughout an ordinary conversation, so that the scanning signal is not reinitiated during normal pauses.

It will be apparent that ring counter 45 may be replaced by any other form of digital counter receiving clock pulses. Digital-to-analog converter 46 will be any mechanism capable of transferring the condition of counter 45 into a control signal to control the frequency of variable frequency oscillator 13.

Additional circuits of a similar nature may be added to check on the reliability of the control network by checking other ranges further outside the voice range.

It will be seen that the present invention provides a control of the mixing oscillator of the single side band receiver which tracks the received audio signal and causes it to be centered within a predetermined range comprising the normal voice range. As used herein the audio range is the range of signals which can be heard by the human ear, and the voice range is the range of frequency signals, normally comprising the human voice, which comprise the modulation on the transmitted signal, for example, the range of 400 cycles per second to 2500 cycles per second.

It will be understood that the present invention, while primarily designed for single side band communication, is equally adapted to other modes of radio transmission, such as suppressed carrier, suppressed side band, or regular AM broadcasting.

Obviously many modifications and variations of the present invention are possible in the light of the above teachings. It is therefore to be understood that within the scope of the appended claims the invention may be practiced otherwise than as specifically described.

What is claimed is:

1. In a radio receiver of the superheterodyne type, a frequency control comprising:

an oscillator having its output mixed with a received radio signal to produce an intermediate frequency;

a detector for subtracting a predetermined frequency from said intermediate frequency to produce an audio frequency output;

a scanning means to cause said oscillator to scan through a predetermined range of frequencies;

a filter passing signals in the voice range, a signal output of which inhibits said scanning means;

a filter tuned to a frequency below said voice range;

means responsive to a signal from said filter below said voice range to alter the frequency of said oscillator to move said audio output to said voice range;

a filter tuned to a signal above said voice range; and means responsive to a signal from said filter above said voice range to alter the frequency of said oscillator to move said audio down to said voice range.

2. A frequency control as recited in claim 1 further comprising:

three bistable storage elements each one set by a signal from one of said filters, all three when set shutting off said scanning means.

3. A frequency control as recited in claim 2 wherein said scanning means comprises:

a clock pulse generator; and a counter advanced by pulses from said clock pulse generator, said clock pulses being inhibited when all three of said bistable storage elements are set, and the frequency of said oscillator being controlled by the condition of said counter.

4. A frequency control as recited in claim 3 wherein:

said filter below said voice range provides a signal which is utilized to allow passage of clock pulses to said counter to raise the frequency of said audio output when all three of said bistable storage elements are set; and said filter above said voice range provides a signal which is utilized to allow passage of clock pulses to said counter to lower the frequency of said audio output when all three bistable storage elements are set.

5. The frequency control as recited in claim 3 further comprising:

a first AND gate issuing an output signal when all three of said bistable storage elements are set;

a second AND gate issuing an output signal when there is a signal from the first AND gate and from the filter below said voice range;

a third AND gate issuing an output signal when there is an output signal from said first AND gate and from the filter above said voice range;

a fourth AND gate issuing an output signal when there is a signal from said first AND gate and no signal from said filter in said voice range;

a fifth AND gate allowing passage of clock pulses to cause said counter to count in one direction when enabled by an output signal from said second AND gate;

a sixth AND gate allowing passage of clock pulse to cause said counter to count in the opposite direction when enabled by said third AND gate;

a seventh AND gate allowing passage of clock pulses to cause said counter to count in one of said directions when enabled; and a bistable storage element set by an output signal from said first AND gate and reset by an output signal from said fourth AND gate, the reset signal from said bistable storage element enabling said seventh AND gate to pass clock pulses to said counter.

6. A frequency control as recited in claim 1 further comprising:

a counter advanced in either of two directions by clock pulses;

a first AND gate enabled by said signal from said filter below said voice range to pass clock pulses to said counter to advance it in one direction; and a second AND gate enabled by said signal from said filter above said voice range to pass clock pulses to said counter to advance it in the opposite direction.

References Cited

UNITED STATES PATENTS 3,274,494 9/1966 Stanley ------------ 325—420

OTHER REFERENCES

Terman, F. E. Electronic and Radio Engineering, 4th ed., McGraw-Hill, 1955, p. 549. TK 6550T4.

KATHLEEN H. CLAFFY, *Primary Examiner.*

R. LINN, *Assistant Examiner.*